(12) United States Patent
Soda et al.

(10) Patent No.: US 6,985,336 B2
(45) Date of Patent: *Jan. 10, 2006

(54) MAGNETIC REPRODUCING HEAD HAVING A STRUCTURE TO INHIBIT ELECTROSTATIC DISCHARGE TO A RECORDING TAPE

(75) Inventors: Yutaka Soda, Kanagawa (JP); Yoshimi Takahashi, Miyagi (JP); Susumu Sato, Miyagi (JP); Seiji Onoe, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/117,207

(22) Filed: Apr. 28, 2005

(65) Prior Publication Data

US 2005/0190506 A1    Sep. 1, 2005

Related U.S. Application Data

(63) Continuation of application No. 10/267,275, filed on Oct. 9, 2002.

(30) Foreign Application Priority Data

Oct. 9, 2001  (JP)  ............................ P2001-311911

(51) Int. Cl.
    *G11B 5/39*     (2006.01)
(52) U.S. Cl. .................................. 360/323; 360/281.6
(58) Field of Classification Search ................ 360/323, 360/281.6
    See application file for complete search history.

(56) References Cited

U.S. PATENT DOCUMENTS 4,803,581 A  *  2/1989  Kira et al. .................. 360/321
4,807,073 A  *  2/1989  Takeura et al. ........ 360/327.21
5,034,285 A  *  7/1991  Satomi et al. ............... 428/692
5,272,582 A  *  12/1993  Shibata et al. ............... 360/323
5,375,022 A  *  12/1994  Gill et al. .................... 360/323
5,465,186 A  *  11/1995  Bajorek et al. .............. 360/323
5,557,492 A  *  9/1996  Gill et al. .................... 360/319
5,761,009 A  *  6/1998  Hughbanks et al. ......... 360/323
5,761,010 A  *  6/1998  Mimura .................. 360/327.32

(Continued)

FOREIGN PATENT DOCUMENTS

JP         60138713  A  *  7/1985

(Continued)

OTHER PUBLICATIONS

NN8808343;IBM TDB, Aug. 1988, "Oxygen Anneal for Ferrite Head Material", vol. # 31, Issue # 3, p. 343.*

(Continued)

*Primary Examiner*—Brian E. Miller
(74) *Attorney, Agent, or Firm*—Sonnenschein, Nath & Rosenthal LLP

(57) ABSTRACT

A head substrate and a protective substrate are formed of an electrostatic-discharge resistant conductive material having an electrical resistivity of $10^2$ to $10^{10}$ Ωcm. These substrates are electrically connected to a base metal through the use of conductive paste and are set to a ground potential via the base metal and a rotating drum. This suppresses a discharge current flowing through an MR element when an electrostatically charged substance touches or approaches a magnetic reproducing head, a terminal, a conducting wire, etc. to generate an electrostatic discharge. The magnetic reproducing head including an MR element and the like is prevented against an electrostatic discharge damage. It is possible to provide the magnetic reproducing head, a head drum apparatus, and a magnetic recording-reproducing apparatus which can highly effectively prevent an electrostatic discharge damage.

1 Claim, 6 Drawing Sheets

U.S. PATENT DOCUMENTS

| | | | |
|---|---|---|---|
| 6,046,890 A * | 4/2000 | Yamada et al. | 360/323 |
| 6,097,570 A * | 8/2000 | Dee | 360/121 |
| 6,246,553 B1 * | 6/2001 | Biskeborn | 360/323 |
| 6,267,903 B1 * | 7/2001 | Watanuki | 216/22 |
| 6,331,924 B1 * | 12/2001 | Takada | 360/323 |
| 6,415,500 B1 * | 7/2002 | Han et al. | 29/603.14 |
| 6,507,466 B1 * | 1/2003 | Hayashi et al. | 360/323 |
| 6,583,971 B1 * | 6/2003 | Shen et al. | 360/327.22 |
| 6,671,137 B2 * | 12/2003 | Ajiki et al. | 360/323 |
| 6,704,174 B2 * | 3/2004 | Soda et al. | 360/323 |
| 6,879,471 B2 * | 4/2005 | Heim et al. | 360/319 |

FOREIGN PATENT DOCUMENTS

| | | | |
|---|---|---|---|
| JP | 03086905 A | * | 4/1991 |
| JP | 05225515 A | * | 9/1993 |
| JP | 2001023123 A | * | 1/2001 |

OTHER PUBLICATIONS

NN75012343;IBM TDB, Jan. 1975, "Polishing Ferrites with Magnesium Oxide", vol. # 17, Issue # 8, p. 2343.*

* cited by examiner

ESD BREAKDOWN VOLTAGE (AMR HEAD)

ESD BREAKDOWN VOLTAGE (GMR HEAD)

US 6,985,336 B2

MAGNETIC REPRODUCING HEAD HAVING A STRUCTURE TO INHIBIT ELECTROSTATIC DISCHARGE TO A RECORDING TAPE

CROSS REFERENCE TO RELATED APPLICATIONS

This is a continuation of U.S. application Ser. No. 10/267,275 filed on Oct. 9, 2002, which claims priority to Japanese Application No. P2001-311911 filed Oct. 9, 2001, both of which are incorporated herein by reference to the extent permitted by law.

BACKGROUND OF THE INVENTION

1. Field of the Invention

The present invention relates to a head drum apparatus for writing and reading signals on magnetic tape and a magnetic recording-reproducing apparatus having the head drum apparatus. More specifically, the present invention relates to a helical scanning magnetic reproducing head using an MR head, a head drum apparatus, and a magnetic recording-reproducing apparatus having the head drum apparatus.

2. Description of Related Art

In recent years, as the amount of information to be handled increases, there is an increasing need for further improving recording densities for a magnetic recording-reproducing apparatus that records and reproduces data on magnetic tape. It is absolutely necessary to use an MR (Magneto Resistive) head instead of a conventional inductive head as a magnetic head for reading signals. The MR head is a magnetic head that reads a signal recorded on a magnetic recording medium using the magnetoresistive effect of an MR element. The MR head can provide high sensitivity of signal detection and large reproduction output. Accordingly, the MR head can easily reduce a recording track width on the magnetic tape, increase the recording density in a linear direction, and provide high-density recording and reproduction.

Generally, the MR head is characterized by susceptibility to electrostatic discharge and heat attack compared to inductive heads. FIG. 4 shows results of measuring ESD (Electrostatic Discharge) breakdown voltages at MR heads. FIG. 4A shows the measurement result of an AMR (Anisotropic Magneto Resistive) head. FIG. 4B shows the measurement result of a GMR (Giant Magneto Resistive) head.

With respect to measured values in FIG. 4, an HBM (Human Body Model) is used to measure ESD breakdown voltages. FIG. 4 shows the relationship between a voltage applied to the device and a resistance when a 100 pF capacitor is charged and then discharged with the resistance of 1.5 kΩ. According to the measurements, the AMR is supplied with an ESD breakdown voltage of approximately 230 to 240 V. The GMR is supplied with an ESD breakdown voltage of approximately 30 to 40 V.

Under normal conditions, friction, contact, induction, or the like easily generates a charged voltage of several kilovolts or more on an insulator such as plastic, nylon, vinyl, etc. For example, a high-resistance synthetic resin material is often used to form a conventional cassette case for taking up and storing magnetic tape. Such cassette case is easily electrostatically charged while a user handles it, for example, due to friction with a packaging material made of artificial fiber, friction with parts when the cassette case is loaded into the magnetic recording-reproducing apparatus, etc.

An ABS resin is one of synthetic resin materials used for cassette cases. For example, an ABS resin with the surface resistance of approximately $10^{16} \Omega$/sq generates a charged voltage of 1.5 to 2 kV or more. It takes three minutes or more to halve the charged voltage. This charged voltage value far exceeds the MR head's withstand voltage. In addition, since the time to halve the charged voltage is long, the static electrification, once charged, hardly attenuates. If the magnetic tape in the electrostatically charged cassette case touches the MR head, a large amount of current flows through the MR head, possibly causing an electrostatic discharge damage.

A conventional MR head uses a head substrate comprising an MR element sandwiched between magnetic shielding films or insulating films. The protective substrate uses a conductive material such as $Al_2O_3$—TiC with the electrical resistivity of approximately $2 \times 10 -3\Omega$cm. The magnetic head is electrically connected to the drum apparatus so that the head substrate and the protective substrate become the ground potential. When the electrostatically charged magnetic tape touches the MR head, the electric charge does not flow through the MR element, but through the head substrate and the protective substrate for discharge.

When the head substrate and the protective substrate are made conductive as mentioned above, however, a high voltage is applied to the MR element due to approach, contact, etc. of a charged substance from the outside. When the electrostatic change is discharged between these substrates, a very large discharge current is generated because the substrates have a low electric resistance. Accordingly, the discharge current flows through the MR element to cause an electrostatic discharge damage.

FIG. 5 schematically shows a discharge on the conventional MR head.

FIG. 5 shows a structure example of an MR head 50 against a magnetic tape's contact surface. The MR head 50 is structured to arrange an MR element 50c, and a pair of shielding films 50d and 50e made of a soft magnetic material between a head substrate 50a and a protective substrate 50b that are both conductive. Insulating films 50f and 50g are formed between a head substrate 50a and a protective substrate 50b and between shielding films 50d and 50e. The MR element 50c is formed between the shielding films 50d and 50e via insulating films 50h and 50i to constitute a reproducing magnetic head section. The MR element 50c is connected to a power supply terminal (not shown) through a conducting wire etc. The MR element 50c is powered from the power supply terminal to read data recorded on the magnetic tape.

The MR head 50 is fixed on a base metal (not shown). The base metal is fixed on a rotating drum (not shown) to mount the MR head 50 thereon. The base metal is made of conductive metal. The head substrate 50a and the protective substrate 50b are electrically connected to the base metal through conductive paste for example. The base metal is fixed on the rotating drum with a metal fixing screw or the like, for example. The rotating drum is connected to the ground in the apparatus to allow the head substrate 50a and the protective substrate 50b to be equal to the ground potential. Accordingly, when the electrostatically charged magnetic tape touches or approaches the head, for example, the magnetic tape is discharged through the head substrate 50a and the protective substrate 50b.

Concerning the MR head 50, a charged substance such as rubbed artificial fiber may touch or approach the power terminal during a production line process, for example. In such case, the electric charge moves to the power supply terminal from the charged substance, increasing the voltage of the MR element 50c. At this time, the electric field concentrates on the shielding film 50d, and then on the head substrate 50a from the MR element 50c touching the magnetic tape's contact surface, thus increasing an electric field strength. Since the insulating films 50f through 50i are thin on the magnetic tape's contact surface, a dielectric breakdown occurs on these films. A discharge current flows into the head substrate 50a from the MR element 50c via the shielding film 50d.

Since the head substrate 50a has a low electric resistance at this time, an excessive current flows into the head substrate 50a from the MR element 50c. Consequently, discharged traces 51a, 51b, 51c, and 51d are formed at discharged locations on the MR element 50c, the shielding film 50d, and the head substrate 50a.

Further, when the charged substance touches or approaches the magnetic tape contact surface of the MR head 50, an electric discharge is applied to the head substrate 50a or the protective substrate 50b to cause an electrostatic discharge damage. FIG. 6 is a graph showing an electric current waveform when the conventional MR head 50 is subject to the experiment on discharging.

FIG. 6 shows currents generated when a voltage-applied probe is moved close to the magnetic tape contact surface of the MR head 50 for a discharge. The applied direct-current voltage is up to 3 kV. As seen from the graph, it is possible that an absolute value for the current exceeds 1 A during a discharge. The MR element 50c is easily subject to meltdown and the like. In addition, a discharge current destroys the shielding films 50d and 50e, the head substrate 50a, and the protective substrate 50b.

SUMMARY OF THE INVENTION

The present invention has been made in consideration of the foregoing. It is therefore an object of the present invention to provide a magnetic reproducing head and a head drum apparatus capable of preventing an electrostatic discharge damage from occurring at an MR head for magnetic tape reproduction when an electrostatically charged substance touches or approaches the MR head.

It is another object of the present invention to provide a magnetic recording-reproducing apparatus capable of preventing an electrostatic discharge damage from occurring at an MR head for magnetic tape reproduction when an electrostatically charged substance touches or approaches the MR head.

To solve the above-mentioned problems, one aspect of the present invention resides in a magnetic reproducing head and a head drum apparatus to write or read a signal from magnetic tape, characterized by comprising: a rotating drum having conductivity to be a ground potential, wherein the magnetic tape is helically wound around an external surface of the rotating drum; a base metal which is fixed inside the rotating drum and is electrically connected to the rotating drum; and a magnetic head section fixed to the base metal, wherein a magnetoresistive effect element to read a recording signal in contact with the magnetic tape is used for a head element section comprising first and second insulating films provided between a pair of magnetic shielding films; the head element section is structured to be provided between a head substrate and a protective substrate electrically connected to the base metal via third and fourth insulating films; and either or both of the head substrate and the protective substrate are given an electrical resistivity of $10^2$ to $10^{10}$ Ωcm.

The magnetic reproducing head and the head drum apparatus use a material having the electrical resistivity of $10^2$ to $10^{10}$ Ωcm for either or both of the head substrate and the protective substrate. These substrates are electrically connected to the base metal to be equal to a ground potential via the base metal and the rotating drum. When an electrostatically charged substance touches or approaches the magnetic head section to discharge electrostatic change, it is possible to suppress a discharge current flowing through the head element. This makes it possible to prevent an electrostatic discharge damage in the magnetic head section such as the head element and the like.

Another aspect of the present invention resides in a magnetic recording-reproducing apparatus to record and reproduce a signal using magnetic tape, characterized by comprising: a rotating drum having conductivity to be a ground potential, wherein the magnetic tape is helically wound around an external surface of the rotating drum; a base metal which is fixed inside the rotating drum and is electrically connected to the rotating drum; and a magnetic head section fixed to the base metal, wherein a magnetoresistive effect element to read a recording signal in contact with the magnetic tape is used for a head element section comprising first and second insulating films provided between a pair of magnetic shielding films; the head element section is structured to be provided between a head substrate and a protective substrate electrically connected to the base metal via third and fourth insulating films; and either or both of the head substrate and the protective substrate are given an electrical resistivity of $10^2$ to $10^{10}$ Ωcm.

The magnetic recording-reproducing apparatus uses a material having the electrical resistivity of $10^2$ to $10^{10}$ Ωcm for either or both of the head substrate and the protective substrate. These substrates are electrically connected to the base metal to be equal to a ground potential via the base metal and the rotating drum. When an electrostatically charged substance touches or approaches the magnetic head section to discharge electrostatic change, it is possible to suppress a discharge current flowing through the head element. This makes it possible to prevent an electrostatic discharge damage in the magnetic head section such as the head element and the like.

Other and further objects, features and advantages of the invention will appear more fully from the following description.

DETAILED DESCRIPTION OF THE PREFERRED EMBODIMENTS

An embodiment of the present invention will be described in further detail with reference to the accompanying drawings.

Figure 2:
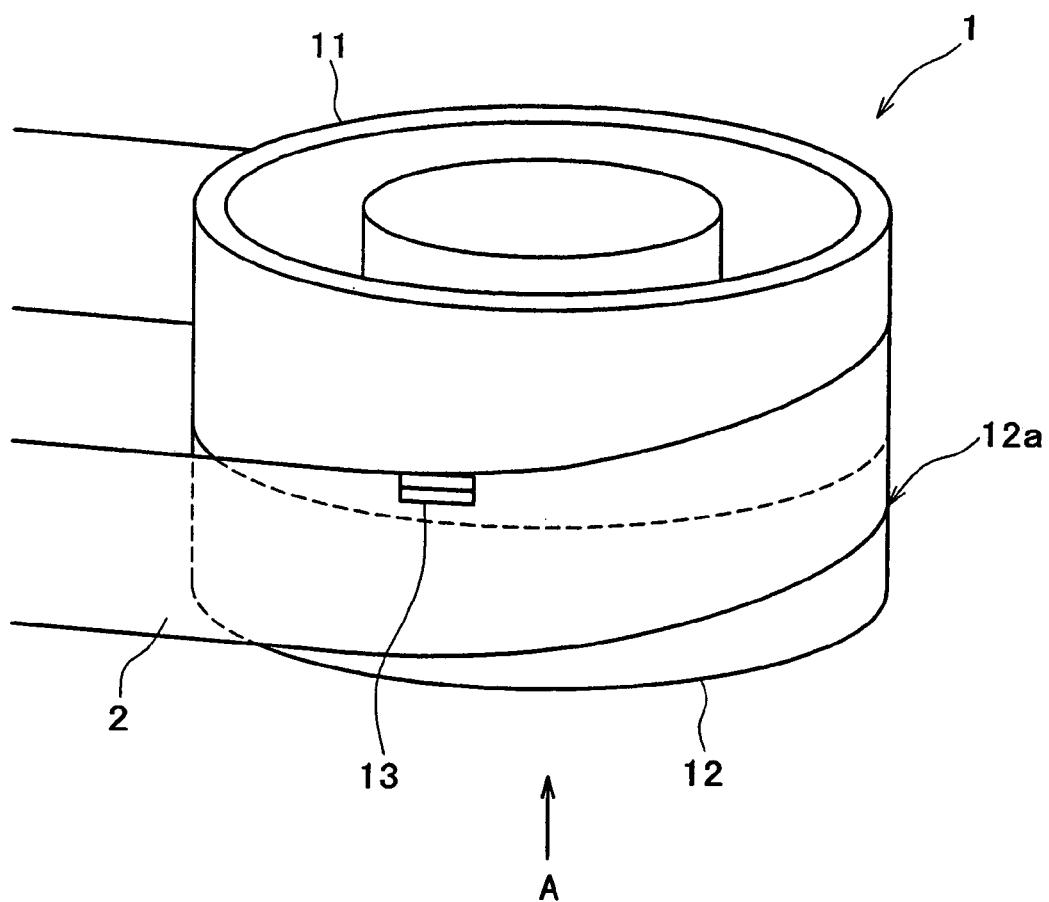
FIG. 2 is a perspective view showing a configuration example of a head drum apparatus according to the present invention.

FIG. 2 is a perspective view showing a configuration example of a head drum apparatus according to the present invention.

Figure 1:
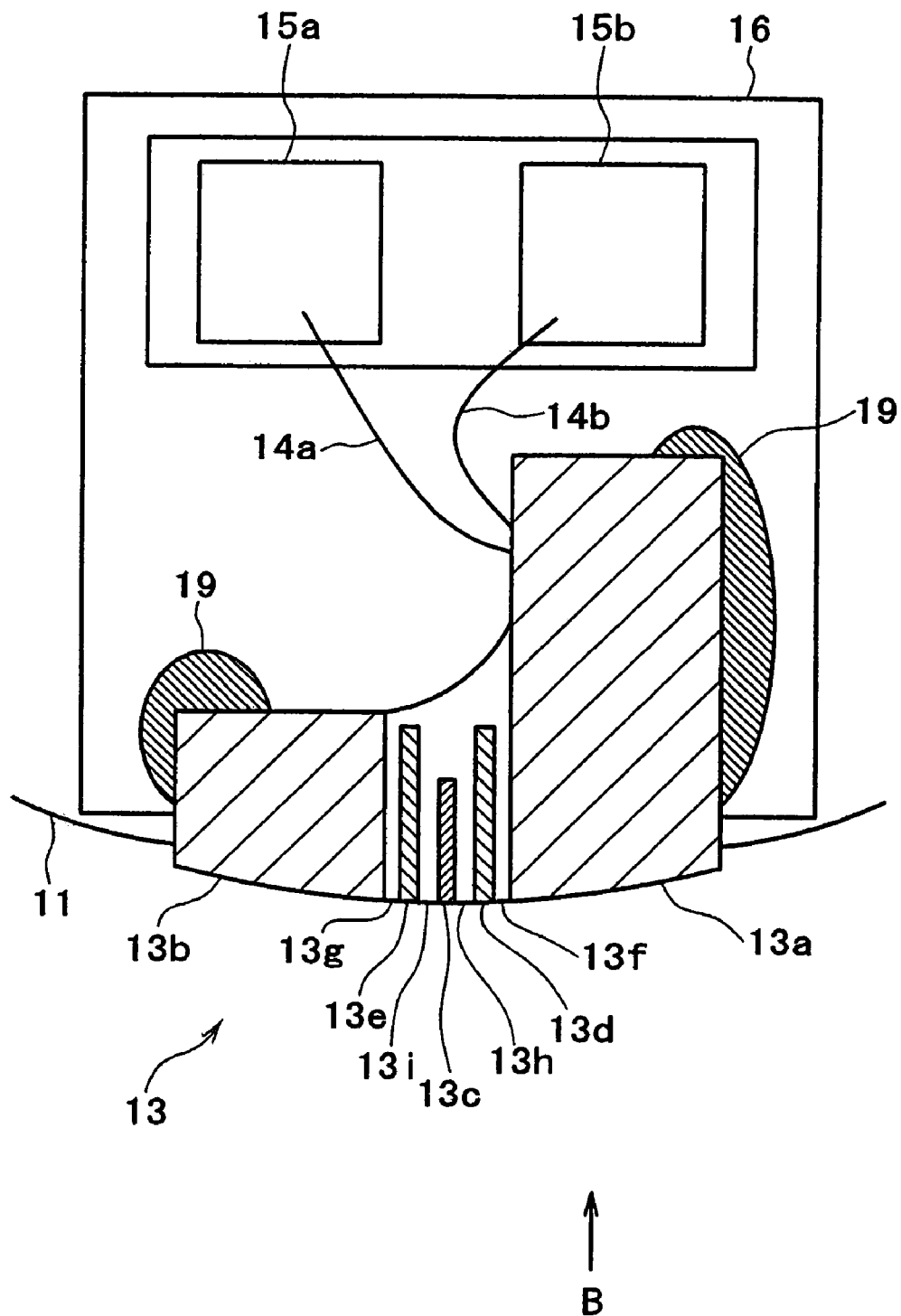
FIG. 1 is a plan view showing a configuration example of a magnetic reproducing head.

A head drum apparatus 1 as shown in FIG. 1 writes and reads data on magnetic tape 2 according to the helical scanning system. For example, the head drum apparatus 1 is used for magnetic recording-reproducing apparatuses including a VTR (video tape recorder) and a video camera with VTR for recording and reproducing video and audio signals, a data storage apparatus for computers, etc.

The cylindrical head drum apparatus 1 has a smooth external surface as a whole. The head drum apparatus 1 comprises a rotating drum 11, a rotating shaft for the rotating drum 11, and a fixed drum 12 fixed on the rotating shaft. The external surface of the fixed drum 12 is provided with a lead 12a for guiding magnetic tape 2. Along the lead 12a, the magnetic tape 2 travels by being helically wound around the external surface of the head drum apparatus 1. The rotating drum 11 is provided with a magnetic reproducing head section 13 for detecting a signal recorded on the magnetic tape 2 and a magnetic recording head (not shown) for writing a signal.

The magnetic reproducing head section 13 is an MR head using a magnetoresistive effect (MR) element as a head element. The magnetic reproducing head section 13 is configured to slightly protrude from the external surface of the rotating drum 11 and touch the magnetic tape 2. The magnetic reproducing head section 13 slantwise scans the magnetic tape 2 in accordance with rotation of the rotating drum 11. The magnetic reproducing head section 13 detects changes in MR element's resistance values in response to a recorded signal to read the signal recorded on the magnetic tape 2. The magnetic recording head is a so-called inductive magnetic head apparatus, e.g., comprising a coil wound around a magnetic core having a magnetic gap. Though not shown in FIG. 2, the rotating drum 11 is normally provided with a plurality of the magnetic reproducing heads 13 and the magnetic recording heads.

A cassette case containing the magnetic tape 2 is loaded into the magnetic recording-reproducing apparatus provided with the head drum apparatus 1. When an operation command is entered to start recording or reproducing data, the rotating drum 11 of the head drum apparatus 1 rotates. In addition, a pinch roller and a plurality of tape guides move to wind the magnetic tape 2 around the head drum apparatus 1. A capstan and a take-up reel rotate to run the magnetic tape 2 and the operation of writing the signal or reading the recorded signal is performed.

Figure 3:
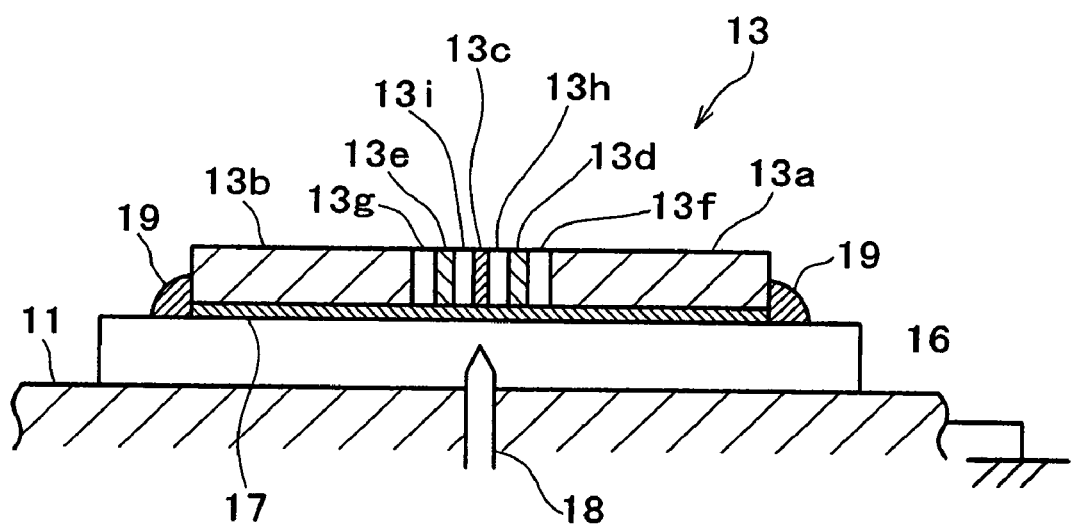
FIG. 3 is a side view showing a configuration example of the magnetic reproducing head.
Figure 4A:
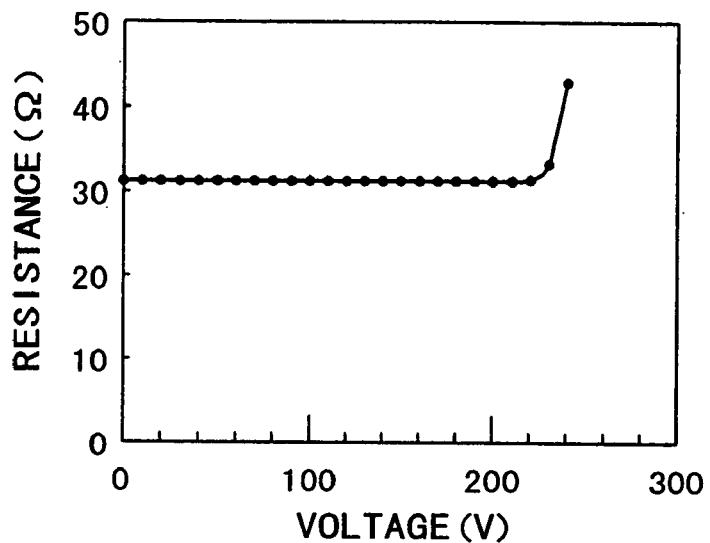
FIGS. 4A and 4B show results of measuring ESD breakdown voltages at MR heads.
Figure 4B:
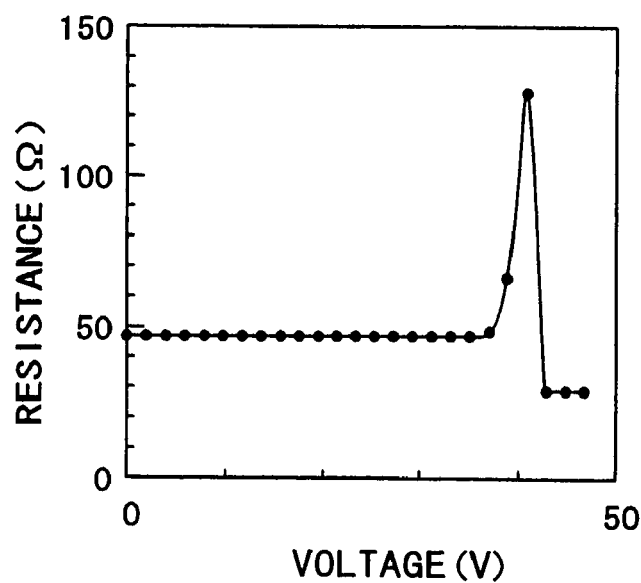
Figure 5:
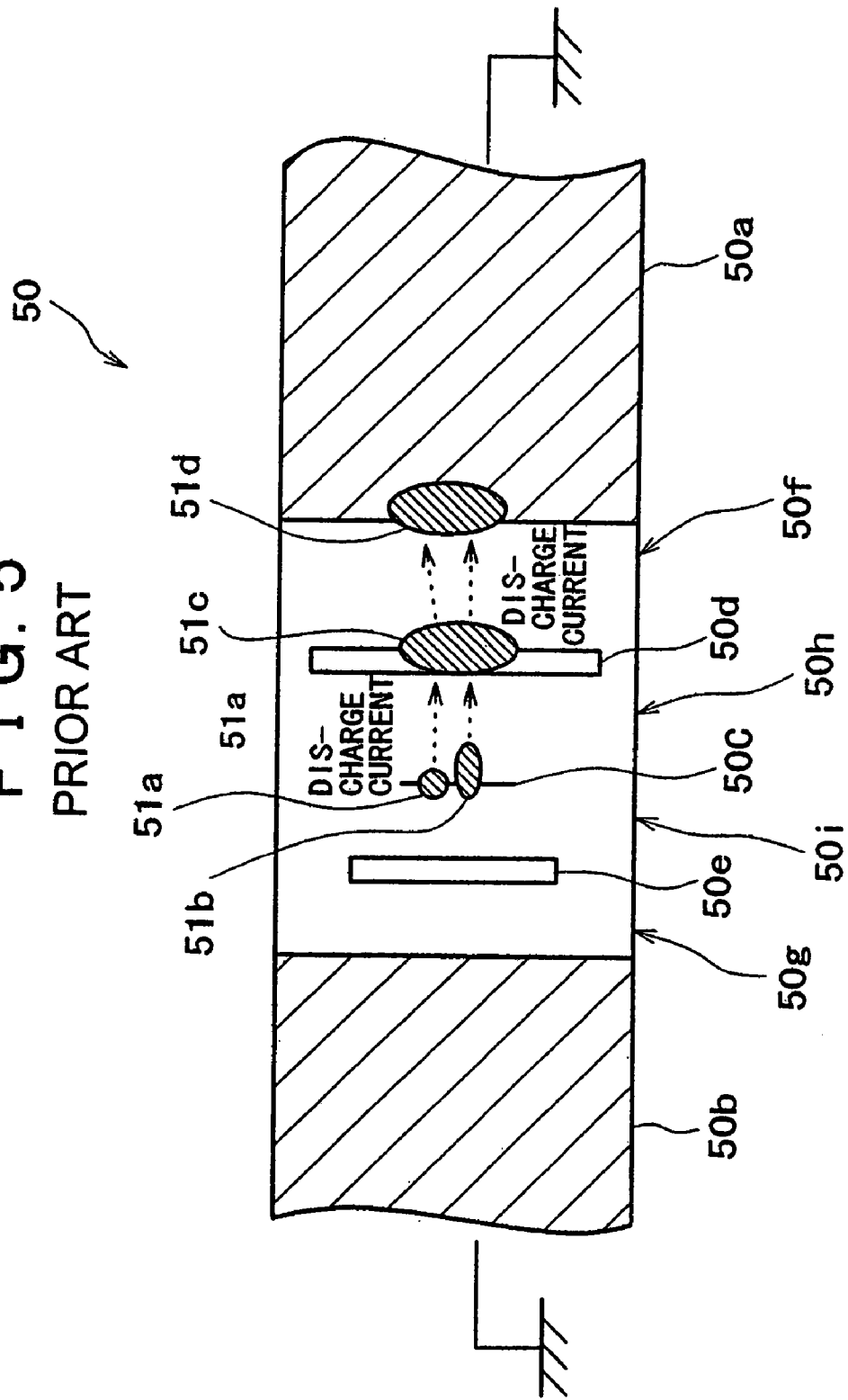
FIG. 5 schematically shows a discharge on a conventional MR head.
Figure 6:
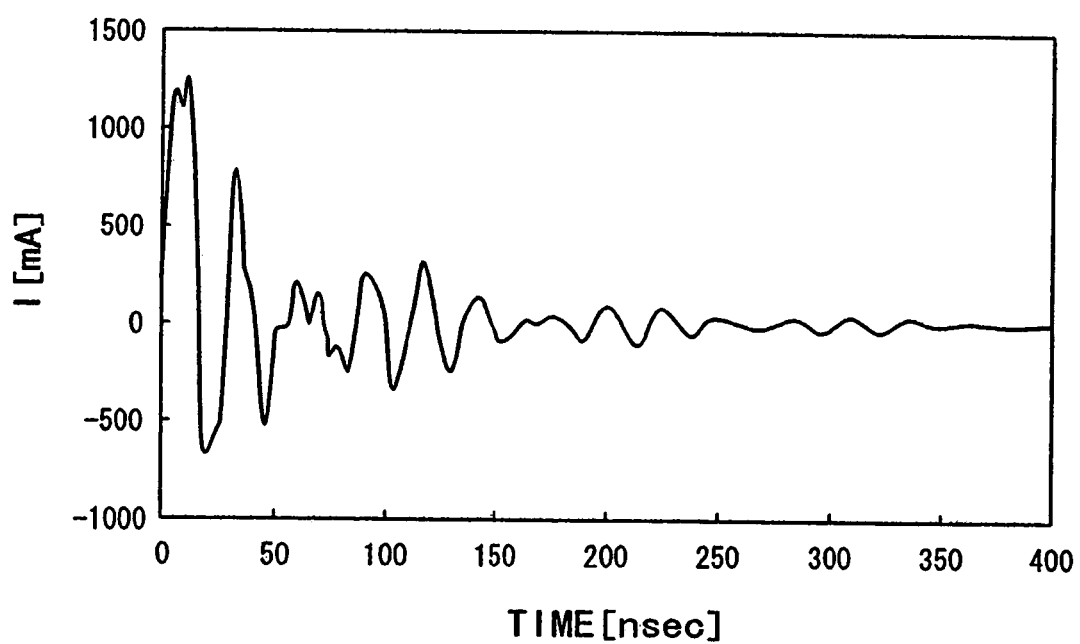
FIG. 6 is a graph showing an electric current waveform when the conventional MR head is subject to the experiment on discharging.

FIG. 1 is a plan view showing a configuration example of the magnetic reproducing head section 13. FIG. 3 is a side view showing a configuration example of the magnetic reproducing head section 13. FIG. 1 shows an enlarged detail of a position for mounting the magnetic reproducing head section 13 viewed from an arrow A in FIG. 2, i.e., from a bottom of the head drum apparatus 1. FIG. 3 shows the magnetic reproducing head section 13 viewed from an arrow B in FIG. 1. The configuration example of the magnetic reproducing head section 13 will now be described with reference to FIGS. 1 and 3.

The magnetic reproducing head section 13 is structured to arrange an MR element 13c, and a pair of shielding films 13d and 13e made of a soft magnetic material between the head substrate 13a and the protective substrate 13b that are electrostatic-discharge resistant conductive. Insulating films 13f and 13g are formed between the head substrate 13a and the protective substrate 13b, and between the shielding films 13d and 13e. The MR element 13c is formed between the shielding films 13d and 13e via insulating films 13h and 13i for sensing magnetism on the magnetic tape 2.

In the magnetic reproducing head section 13, the shielding films 13d and 13e constitute a pair of magnetic shielding members. The MR element 13c is provided in a shield gap between the pair of magnetic shielding members. This structure improves frequency characteristics and resolution. The shielding films 13d and 13e are made of, e.g., Permalloy plated films. The insulating films 13f through 13i are made of $Ai_2O_3$, for example. These films are formed on the head substrate 13a according to the thin film technology. The protective substrate 13b is joined to form the magnetic reproducing head section 13. An edge surface of the magnetic reproducing head section 13 faces toward the outside (the bottom direction in FIG. 1) from the external surface of the rotating drum 11. The edge surface is polished to function as a contact surface with the magnetic tape 2.

The magnetic reproducing head section 13 is connected to terminals 15a and 15b through conducting wires 14a and 14b etc. to supply power to the magnetic reproducing head section 13. Further, as shown in FIG. 3, the magnetic reproducing head section 13 is bonded to a conductive base metal 16 by means of an epoxy adhesive 17, for example. The base metal is fixed to the rotating drum 11 through a conductive fixing screw 18.

The base metal 16 is made of, e.g., copper or the like. The base metal 16 is fixed with the conductive fixing screw 18 and is electrically connected to the rotating drum 11. In addition to the adhesive 17, for example, the conductive paste 19 or the like is used to electrically connect the head substrate 13a and the protective substrate 13b to the base metal 16. For example, silver paste is used for the conductive paste 19. The rotating drum 11 is formed of aluminum or the like and is therefore conductive. For example, a spring is connected to the rotating drum 11. The spring contacts with, e.g., a chassis used as a ground for the magnetic recording-reproducing apparatus, providing a ground potential. Accordingly, the head substrate 13a and the protective substrate 13b are connected to the rotating drum 11 via the conductive paste 19, the base metal 16, and the fixing screw 18, and is provided with the ground potential.

FIGS. 1 and 3 show enlarged views of the MR element 13c for easy understanding. Actually, however, the MR element 13c is very small compared to the head substrate 13a and the protective substrate 13b.

Normally, a high-resistance synthetic resin material is used for a cassette case to take up and store the magnetic tape 2. Such cassette case is easily charged with electrostatic change during handling by a user, for example, when the cassette case is rubbed with a packaging material or gloves made of artificial fiber or when the cassette case is rubbed against other parts during loading into the magnetic recording-reproducing apparatus. Accordingly, the electrostatically charged magnetic tape 2 may touch or approach the magnetic reproducing head section 13.

The head drum apparatus 1 specifies the electrical resistivity of $10^{10}$ Ωcm or less for the head substrate 13a and the protective substrate 13b of the magnetic reproducing head section 13. As a result, the head substrate 13a and the protective substrate 13b are protected against an electrostatic charge and are set to the ground potential. This provides a flow of electric charge without a route to the MR element 13c when the magnetic tape 2 touches the magnetic reproducing head section 13.

However, it is impossible to completely prevent a discharge to the MR element 13c from the touched or approaching magnetic tape 2. If too low an electrical resistivity is given to the head substrate 13a and the protective substrate 13b, the magnetic tape 2 or the MR element 13c applies an excess discharge current to the head substrate 13a or the protective substrate 13b. Consequently, the discharge current causes meltdown for the MR element 13c, the shielding films 13d and 13e, the head substrate 13a, and the protective substrate 13b or dielectric breakdown for the insulating films 13f, 13g, 13h, and 13i.

During a production line process of the head drum apparatus 1, for example, a charged substance such as rubbed artificial fiber may touch or approach the terminals 15a and 15b and the conducting wires 14a and 14b. An electric charge moves from the charged substance to increase the voltage of the MR element 13c. One or more of the insulating films 13f through 13i are subject to dielectric breakdown, allowing a discharge current to flow. If too low an electric resistance is given to the head substrate 13a or the protective substrate 13b, an excess current is applied to these substrates from the MR element 13c. A discharged location is destroyed to generate a discharged trace.

The amount of discharge current must be regulated to prevent the magnetic reproducing head section 13 from being damaged due to an excess discharge current during a discharge. For this reason, the head drum apparatus 1 according to the present invention uses an electrostatic-discharge resistant conductive material for the head substrate 13a and the protective substrate 13b to prevent an electrostatic charge and an excess discharge current from occurring. Specifically, the material to be used has the electrical resistivity of $10^2$ to $10^{10}$ Ωcm.

When a charged substance touches or approaches the terminals 15a and 15b, for example, an electric field concentrates on, e.g., the shielding film 13d or the head substrate 13a from the MR element 13c at the contact surface of the magnetic tape 2, generating a high voltage. When an electrostatic-discharge resistant conductive material is used for the head substrate 13a, the MR element 13c generates a discharge current of several to several tens of milliamperes to the shielding film 13d and the head substrate 13a. Consequently, no meltdown occurs at these discharged positions. The insulating films 13f and 13h are free from dielectric breakdown.

The following describes in more detail the electrostatic-discharge resistant conductive material available for the head substrate 13a and the protective substrate 13b.

The electrostatic-discharge resistant conductive material available for the present invention can be α-$Fe_2O_3$ (α-hematite). Generally, α-$Fe_2O_3$ is characterized by the electrical resistivity of $10^5$ to $10^7$ Ωcm. When this material was actually used for the head substrate 13a, for example, actual measurements showed the electrical resistivity of $7.7 \times 10^5$ Ωcm or $7.7 \times 10^6$ Ωcm. The α-$Fe_2O_3$ material becomes nonmagnetic within the range of –10° to 60° C. as a normal operating temperature.

A more preferable electrostatic-discharge resistant conductive material can be a ferrite material that excels in the abrasion resistance to the magnetic tape 2. More specifically, available examples include NiZn ferrite, MnZn ferrite, etc. These ferrite materials are often used as magnetic materials. To prevent an effect on magnetic characteristics of the MR element 13c, the present invention requires the Curie temperature to be –10° C. (lower bound for the normal operating temperature) or lower.

The following composition ratios are applicable to the ferrite materials having the above-mentioned characteristics. The NiZn ferrite should comprise 45 to 55 mol % of $Fe_2O_3$ and 38 to 50 mol % of ZnO with the remainder of NiO. In this case, NiO must be always contained. The MnZn ferrite should comprise 48 to 55 mol % of $Fe_2O_3$ and 31 to 50 mol % of ZnO with the remainder of MnO. Also in this case, MnO must be always contained.

Here are presented actual measurements for the manufactured MnZn ferrites. The MnZn ferrite comprises 48 mol % of $Fe_2O_3$, 40 mol % of ZnO, and 12 mol % of MnO. Such MnZn ferrites are manufactured through the pressure and heat treatment in a reducing atmosphere and a normal oxygen atmosphere. Both MnZn ferrites showed the Curie temperature of –20° C. or lower and relative permeability $\mu$ of 1.5 at 20° C. The electrical resistivity resulted in $10^3$ Ωcm after the treatment in the reducing atmosphere and in $10^7$ Ωcm after the treatment in the normal atmosphere.

The above-mentioned electrostatic-discharge resistant conductive material is used for the head substrate 13a and the protective substrate 13b. These substrates are set to the ground potential. When an electrostatically charged substance touches or approaches the magnetic reproducing head section 13, the substrates are protected against being charged electrostatically. Further, it is possible to discharge a discharge current generated by electrostatic discharge from the charged substance by decreasing the discharge current to a safe level. This can prevent an electrostatic discharge damage for the MR element 13c, the shielding films 13d and 13e, the head substrate 13a, the protective substrate 13b, etc.

A chance of causing an electrostatic discharge damage decreases when a charged substance exists near the magnetic reproducing head section 13 during a production line process of the head drum apparatus 1. As a result, the yield ratio improves. Further, the electrostatic discharge decreases even if it occurs duet to a contact between the magnetic reproducing head section 13 and the magnetic tape 2. This prevents an electrostatic discharge damage to the MR element 13c due to friction with the magnetic tape 2. Even if the surface of the magnetic tape 2 is coated with a high-resistance magnetic film that can be easily charged with electrostatic change, the MR element 13c becomes less frequently subject to an electrostatic discharge damage.

The above-mentioned magnetic reproducing head section 13 uses the electrostatic-discharge resistant conductive material for both the head substrate 13a and the protective substrate 13b. The electrostatic-discharge resistant conductive material may be used to form only either of these substrates.

The above-mentioned head drum apparatus 1 can be used for not only magnetic recording-reproducing apparatuses, but also magnetic reproducing apparatuses only capable of magnetic tape reproduction.

The foregoing invention has been described in terms of preferred embodiments. However, those skilled, in the art will recognize that many variations of such embodiments exist. Such variations are intended to be within the scope of the present invention and the appended claims.

What is claimed is:

1. A magnetic recording-reproducing apparatus to record and reproduce a signal using magnetic tape, comprising:
   a chassis;
   a rotating drum which is made of conductive material and connected to a chassis through a spring, the chassis being a ground potential portion of the magnetic recording-reproducing apparatus, wherein the magnetic tape is helically wound around an external surface of the rotating drum;

which is made of conductive material and connected to a chassis through a spring, the chassis being a ground potential portion of the magnetic recording-reproducing apparatus, wherein the magnetic tape is helically wound around an external surface of the rotating drum;

a base metal which is fixed inside the rotating drum and is electrically connected to the rotating drum; and a magnetic head section fixed to the base metal, wherein a magnetoresistive effect element to read a recording signal in contact with the magnetic tape is used for a head element section comprising first and second insulating films provided between a pair of magnetic shielding films; the head element section is structured to be provided between a head substrate and a protective substrate electrically connected to the base metal via third and fourth insulating films; and at least one of the head substrate and the protective substrate are formed of a material comprising one of an NiZn ferrite and an MnZn ferrite with an electrical resistivity of $10^2$ to $10^7$ $\Omega$cm and a Curie temperature of lower than $-10°$ C.

\* \* \* \* \*